United States Patent

Doner et al.

[11] Patent Number: 6,088,592
[45] Date of Patent: *Jul. 11, 2000

[54] WIRELESS SYSTEM PLAN USING IN BAND-TRANSLATORS WITH DIVERSITY BACKHAUL TO ENABLE EFFICIENT DEPOLYMENT OF HIGH CAPACITY BASE TRANSCEIVER SYSTEMS

[75] Inventors: John R. Doner, Sebastian; Ronald R. Carney, Palm Bay; Michael A. Komara, Indialantic, all of Fla.

[73] Assignee: Airnet Communications Corporation, Melbourne, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/622,550

[22] Filed: Mar. 25, 1996

[51] Int. Cl.[7] .................................................. H04Q 7/36
[52] U.S. Cl. .......................................... 455/447; 455/11.1
[58] Field of Search .................................. 455/33.1, 33.3, 455/33.4, 53.1, 54.1, 56.1, 62, 63, 15, 16, 17, 11.1, 133, 134, 135, 77.1, 422, 507, 517, 524, 561, 562, 277.1, 448, 447, 449, 450, 464, 509; 370/315, 329, 330, 341

[56] References Cited

U.S. PATENT DOCUMENTS

| | | | |
|---|---|---|---|
| 4,110,710 | 8/1978 | Watson | 333/10 |
| 4,550,443 | 10/1985 | Freeburg | 455/33 |
| 4,727,590 | 2/1988 | Kawano et al. | 455/33 |
| 4,850,032 | 7/1989 | Freeburg | 455/51 |
| 4,941,200 | 7/1990 | Leslie et al. | 455/17 |
| 5,038,399 | 8/1991 | Bruckert | 455/33 |
| 5,095,528 | 3/1992 | Leslie et al. | 455/10 |
| 5,115,514 | 5/1992 | Leslie | 455/9 |
| 5,142,691 | 8/1992 | Freeburg et al. | 455/38.2 |
| 5,152,002 | 9/1992 | Leslie et al. | 455/11.1 |
| 5,168,574 | 12/1992 | Gordon et al. | 455/9 |
| 5,218,715 | 6/1993 | Leslie et al. | 455/15 |
| 5,247,699 | 9/1993 | Hartman | 455/33.1 |
| 5,321,542 | 6/1994 | Freitas et al. | 370/84 |
| 5,339,330 | 8/1994 | Mallinckrodt | 375/1 |
| 5,355,520 | 10/1994 | Freeburg et al. | 455/53.1 |
| 5,404,570 | 4/1995 | Charas et al. | 455/22 |
| 5,412,658 | 5/1995 | Arnold et al. | 455/454 |
| 5,479,400 | 12/1995 | Dilworth et al. | 455/33.1 |
| 5,509,028 | 4/1996 | Marque-Pucheu | 375/211 |
| 5,521,961 | 5/1996 | Fletcher et al. | 379/59 |
| 5,537,680 | 7/1996 | Bruno | 455/15 |
| 5,544,171 | 8/1996 | Gödecker | 370/95.3 |
| 5,548,813 | 8/1996 | Charas et al. | 455/33.3 |

(List continued on next page.)

FOREIGN PATENT DOCUMENTS

| | | |
|---|---|---|
| 2128810 | 1/1995 | Canada . |
| 0406905 | 9/1991 | European Pat. Off. .................. 7/155 |
| 94/11957 | 5/1994 | WIPO . |

OTHER PUBLICATIONS

"HPT Series—High Power Cell Site Expander" by 3dbm, Inc., Camarillo, CA. No date given.

(List continued on next page.)

Primary Examiner—Andrew I. Faile
Assistant Examiner—Aung S. Moe
Attorney, Agent, or Firm—Quarles & Brady, LLP

[57] ABSTRACT

A wireless system architecture whereby high efficiency broadband transceiver systems can be deployed at an initial build out stage of the system in a cost-efficient manner. A home base station location is identified within each cluster of cells and rather than deploy a complete suite of base station equipment at each of the cells in the cluster, inexpensive translator units are located in the outlying cells serviced by the home base station in which low traffic density is expected. The translators are connected to directional antennas arranged to point back to the home base station site. The translators are deployed in such a way which meshes with the eventually intended frequency reuse for the entire cluster of cells. The translator to base station radio links operate in-band that is, within the frequencies assigned to the service provider. The available frequency bands are divided into at least two sub-bands, with frequency translations ocurring entirely within a given sub-band.

21 Claims, 7 Drawing Sheets

U.S. PATENT DOCUMENTS

| | | | |
|---|---|---|---|
| 5,574,466 | 11/1996 | Reed et al. | 455/277.1 |
| 5,602,834 | 2/1997 | Dean et al. | 455/276.1 |
| 5,602,903 | 2/1997 | LeBlanc et al. | 455/456 |
| 5,621,786 | 4/1997 | Fischer et al. | 455/33.1 |
| 5,623,485 | 4/1997 | Bi | 370/209 |
| 5,657,343 | 8/1997 | Schilling | 455/450 |
| 5,664,004 | 9/1997 | Durchman et al. | 455/466 |
| 5,671,219 | 9/1997 | Jensen et al. | 455/38.3 |
| 5,970,406 | 10/1999 | Komara | 455/422 |
| 5,970,410 | 10/1999 | Carney et al. | 455/447 |
| 5,974,323 | 10/1999 | Doner | 455/447 |

OTHER PUBLICATIONS

"HPT Series 6–Channel, High–Power Cell Site Expander—Supplemental Product Information" by 3dbm, Inc., Camarillo, CA. No date given.

"PMR—722GC1 Sector–Extender™ Repeater," Allen Telecom Systems, Cleveland, OH. No date given.

"Extended Cells Improve Rural GSM Coverage," *Mobile Communications International*, Sep./Oct. 1995.

WIRELESS SYSTEM PLAN USING IN BAND-TRANSLATORS WITH DIVERSITY BACKHAUL TO ENABLE EFFICIENT DEPOLYMENT OF HIGH CAPACITY BASE TRANSCEIVER SYSTEMS

FIELD OF THE INVENTION

This invention relates generally to wireless communication systems and in particular to a system architecture that makes use of in band-translators deployed in peripheral cells of a cell cluster.

BACKGROUND OF THE INVENTION

The demand for wireless communication services such as Cellular Mobile Telephone (CMT), Digital Cellular Network (DCN), Personal Communication Services (PCS) and the like typically requires the operators of such systems to serve an ever increasing number of users in a given service area. As a result, a type of base station equipment known as a multichannel broadband transceiver system (BTS) has been developed which is intended to service a relatively large number of active mobile stations in each cell. Such a broadband transceiver system can typically service, for example, ninety-six simultaneously active mobile stations in a single four-foot tall rack of electronic equipment. This base station equipment typically costs less than $2000 to $4000 per channel to deploy, and so the cost per channel serviced is relationally low.

When coupled with efficient frequency reuse schemes, such as that described in a co-pending U.S. patent application Ser. No. 08/331,455 entitled "A Method For Obtaining Times One Frequency Reuse in Communication Systems" filed by John R. Doner on Oct. 31, 1994 and assigned to AirNet Communications Corporation, who is the assignee of the present application, maximum efficiency in densely populated urban environments is obtained. According to that arrangement the cells are each split into six radial sectors and frequencies are assigned to the sectors in such a manner as to provide the ability to reuse each available frequency in every third cell. Although this frequency reuse scheme is highly efficient, it requires at least two complete sets of multichannel transceiver equipment such as in the form of a broadband transceiver system (BTS) to be located in each cell.

An important practical consideration however, is that when a wireless system first comes on line, demand for use in most of the cells is relatively low. It is therefore typically not possible to justify the cost of deploying complex multichannel broadband transceiver system equipment based only upon the initial number of subscribers. Because only a few cells at high expected traffic demand locations (such as in a downtown urban location or a freeway intersection) will justify the expense of building out a network of high capacity broadband transceiver systems the service provider is faced with a dilemma. He can buildout the system with less expensive narrowband equipment initially to provide some level of coverage, and then upgrade to the more efficient equipment as the number of subscribers rapidly increases in the service area. However, the initial investment in narrowband equipment is then lost. Alternatively, a larger up front investment can be made to deploy the high capacity equipment at the beginning, so that once demand increases the users of the system can be accommodated without receiving busy signals and the like. But this has the disadvantage of carrying the money cost of a larger up front investment.

Some have proposed various techniques for extending the service area of a given cell. For example, U.S. Pat. No. 4,727,390 issued to Kawano et al. and assigned to Mitsubishi Denki Kabushiki Kaisha discloses a mobile telephone system in which a number of repeater stations are installed at the boundary points of hexagonally shaped cells. The repeaters define a small minor array which is superimposed on a major array of conventional base stations installed at the center of the cells. With this arrangement, any signals received in so-called minor service areas by the repeaters are relayed to the nearest base station.

Another technique was disclosed in U.S. Pat. No. 5,152,002 issued to Leslie et al., and assigned to Orion Industries, Inc., wherein the coverage of a cell is extended by including a number of so-called "boosters" arranged in a serial chain. As a mobile station moves along an elongated area of coverage, it is automatically picked up by an approaching booster and dropped by a receding booster. These boosters, or translators, use highly directive antennas to communicate with one another and thus ultimately via the serial chain with the controlling central site. The boosters may either be used in a mode where the boosted signal is transmitted at the same frequency as it is received or in a mode where the incoming signal is retransmitted at a different translated frequency.

Unfortunately, each of these techniques have their difficulties. With the first method, which uses an array of repeaters co-located with the primary cell sites, the implementation of diversity receivers becomes a problem. Specifically, certain types of cellular communication systems, particularly those that use digital forms of modulation, are susceptible to multi-path fading and other distortion. It is imperative in such systems to deploy spatial diversity antennas at each cell site in order to minimize multipath distortion. Unfortunately, the repeater array scheme makes implementation of diversity antennas extremely difficult, since each repeater simply forwards its received signal to the base station. Diversity information as represented by the phase of the signal received at the repeater location is thus lost.

The second scheme works fine in a situation where the boosters are intended to be laid in a straight line such as along a highway, a tunnel, a narrow depression in the terrain such as a ravine or adjacent a riverbed. However, there is no teaching of how to efficiently deploy the boosters in a two-dimensional grid, or to share the available translated frequencies as must be done if the advantages of cell site extension are to be obtained throughout an entire service region, such as a large city. This second scheme also suffers from the same problem as the first in that there is a loss of diversity information at the booster locations.

DESCRIPTION OF THE INVENTION

Objects of the Invention

It is an object of this invention to provide a wireless system architecture whereby high efficiency broadband transceiver systems can be deployed at an initial build-out stage of the system in a cost-efficient manner.

A second objects to provide a wireless system in which hardware deployment costs are strictly driven by user demand throughout the stages of system deployment.

A further object is to provide such a system in which spatial diversity information is not compromised and can be fully processed at a point in the system where radio signals received from the mobile stations are demodulated.

Another object is to provide such a system in which the initial build-out footprint of cells may be the same as in a completely built out system, to avoid the need for reconfiguring cells and associated antenna sites.

SUMMARY OF THE INVENTION

Briefly, the invention is an architecture for a wireless communication system in which the cells are grouped into clusters and the available frequency spectrum is divided into frequency reuse groups. A home cell location is identified within each cluster and a base station located at or near the home cell site serves the multiple cells in the reuse cluster.

Rather than deploy a complete suite of base station equipment at each of the cells in the cluster, translator units are located in the outlying cells serviced by the home base station. The translators are connected to directional antennas arranged to point back to the home base station site.

Frequency assignments are made to the translators in a way which meshes with the eventually intended frequency reuse for the entire cluster of cells. More particularly, the translator to base station radio links operate in-band, that is within the frequencies assigned to the service provider. Each of the available frequency bands is then further divided into at least two sub-bands.

The sub-band frequency assignments are made as follows. The mobile stations communicate with the translator base stations in a conventional fashion, that is the downlink channel frequencies (from the base station to the mobile station) are selected from a lower sub-band of frequencies and the uplink channel frequencies (from the mobile station to the base station) are selected from the upper band of frequencies. However, frequency assignments are made in a particular fashion to permit compatibility with eventual frequency reuse configurations when the system is completely built-out. In particular, the uplink signal received from a mobile station is translated to other frequencies in the same subgroup of frequencies.

The translator base station typically makes use of directional receiving equipment and diversity antennas. The frequency assignment scheme thus also accommodates the carrying of diversity information back to the home base transceiver system. For example two backhaul uplink channels are continuously assigned to permit transmission of diversity signals back to the home base. This permits coherent diversity determination to take place after digital demodulation in the home base station. The two backhaul frequencies and the input translator frequency are chosen to be within the same frequency subgroup and are also chosen to match the eventual frequency reuse plan that is desired.

Efficient high density frequency reuse is planned for at the initial system build-out stages by selecting backhaul and mobile frequencies in a particular fashion. For example, an initial "N=12" reuse pattern may be used which permits the deployment of twelve (12) cells around the home cell site in all approximately equidistant fashion. The N=12 pattern is then repeated throughout the service area by inverting the orientation of the alternating columns of cell groups.

The set of mobile station and backhaul frequencies collectively may be combined to provide a subset of frequencies which will be eventually assigned in single cell and multiple cell patterns as the system is fully brought on line. For example, the twelve cell frequency reuse plan may be implemented by dividing the 5 MHz Personal Communication System (PCS) radio spectrum into three sub-bands of contiguous 5 MHz segments. A given 5 MHz segment supports 25 radio frequency channels in the PCS-1900 protocol which may be further sub-divided into four subsets of six channels each. Each of the four subsets are selected having channels spaced four apart within the 5 MHz sub band from which it is drawn. This results in a total of twelve frequency subsets of six channels each that are then allocated to the cells in a twelve cell reuse pattern.

The frequencies to be used in conjunction with each of the translators are then chosen to create minimal impact as individual cells are migrated upward from one or two carriers made available when translators are deployed to the twelve cell density of six RF carriers per cell in which lull base transceiver systems are deployed in this cell. When one or more of the cells in a twelve cell pattern requires a demand level needing two or more carriers an equipment reconfiguration is made where a base transceiver system is deployed in the cell.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
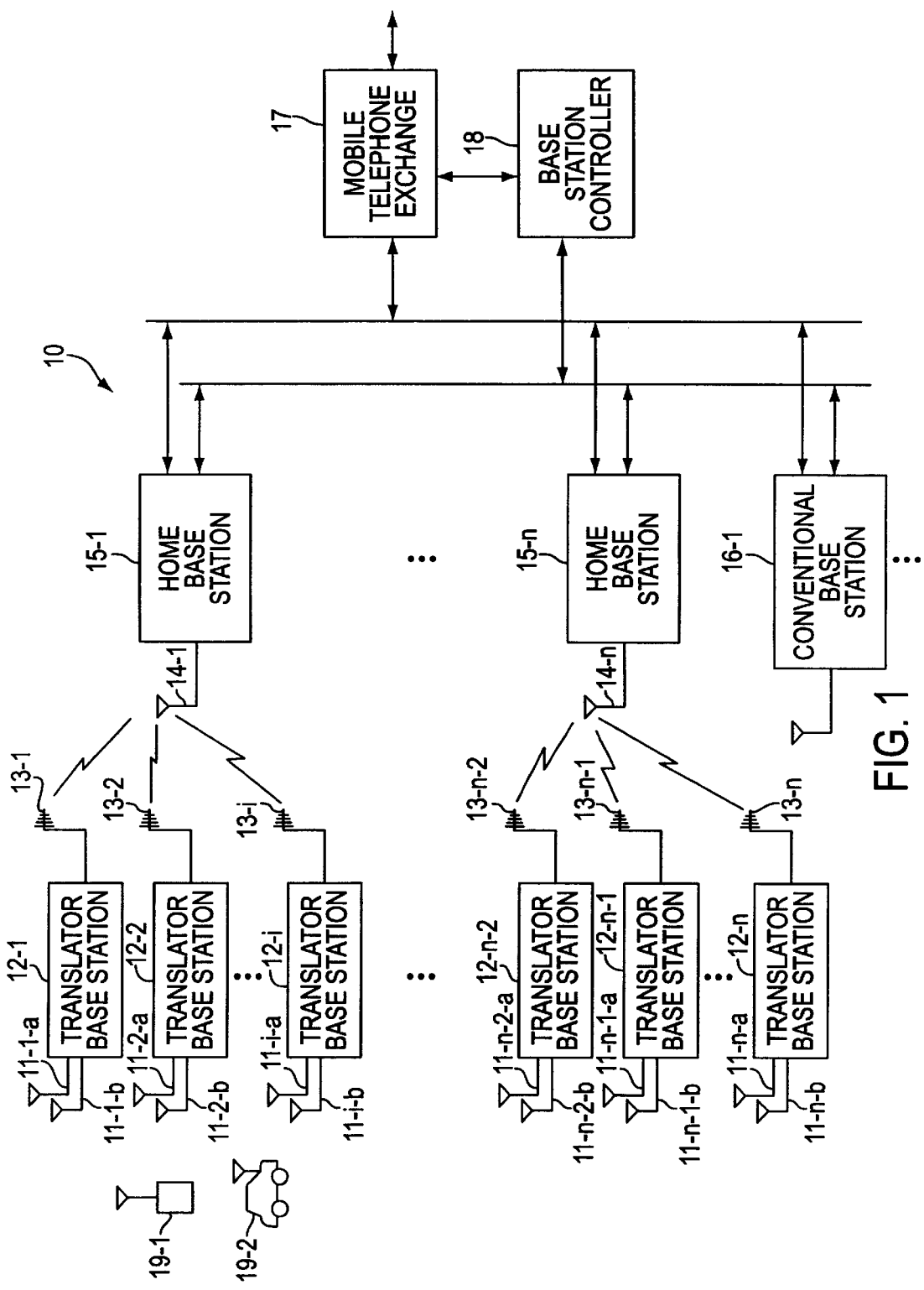
FIG. 1 is a block diagram of the components of a wireless communication system that makes use of in-band translators, home base stations, conventional base stations, and mobile stations according to the invention.

FIG. 1 is a block diagram of the components of a wireless communication system such as a Personal Communication System (PCS) or similar cellular system 10 in which translator base stations are initially deployed in peripheral cells of a cell cluster to concentrate radio signal traffic to and from a mobile station and a central cell serviced by a home base station. The present invention concerns a technique for making in-band radio frequency channel assignments to the translator base stations, home base stations, and mobile stations in a particular fashion that efficiently accommodates deployment of high capacity Broadband Transceiver Systems even in situations of relatively low expected subscriber demand.

The system 10 includes translator omni-directional antennas 11-1-*a*, 11-1-*b*, 11-2-*a*, 11-2-*b*, . . . , 11-n-1-*a*, 11-n-1-*b*, 11-n-*a*, 11-n-*b*, (collectively the omni-directional antennas 11), translator base stations (translators) 12-1, 12-2, ..., 12-n, translator directional antennas 13-1, 13-2, ..., 13-n, home base station antennas 14-1, ..., 14-m, home base stations 15-1, ..., 15-m, one or more conventional base stations 16-1, a mobile telephone exchange 17, one or more base station controllers 18, and mobile stations 19-1, 19-2. The system 10 provides voice and or data communication between the mobile stations 19 and the Public Switch Telephone Network (PSTN) by sending signals over radio channels. In the particular embodiment of the invention being described, the radio signaling protocol or "air interface" may, for example, be the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The translators 12-1, 12-2, ..., 12-i are typically each located in what would normally he considered approximately the center of a cell site. The translators 12 receive radio signals from the mobile stations 19 and forward them to their associated home base station 15-1. Likewise radio signals originating at the home base station 15-1 are forwarded by the translators 12 to the mobile stations 19.

The translators 12 are not "base stations" in the sense that they do not perform demodulation and modulation functions or PSTN connection functions within each cell as would a conventional base station. Rather, each serves to frequency-translate signals received from the mobile stations 19 located in its respective cell, and then to direct such signals on to one or more different carrier frequencies to the home base station 15-1. The translators 12 also perform the inverse functions to translate signals received from the home base station to direct them to the mobile stations 19. The specific manner of translation will be discussed below in connection with FIGS. 2 through 7.

The home base stations 15-1, ..., 15-mn and conventional base station 16-1 are responsible for demodulating radio signals and connecting them to the Public Switched Telephone Network (PSTN) through the mobile exchange 17. The home base stations 15-1, ..., 15-m and conventional base station 16-1 also modulate signals received from the PSTN through the mobile exchange 17 to format them for transmission over the air to the mobile stations 19 through the translators 12.

The conventional base station 16-1, which may or may not be present, operates as in the prior art to directly service the mobile units 19 located in or traveling through its associated cell.

The base station controller 18, of which there may be more than one, has a number of functions. The primary function is to manage the logical connections made between mobile stations 19 and the PSTN. In order to do so, the base station controller 18 assigns transmit and receive radio carrier frequencies to each individual mobile station 19, translator 12, home base station 15, and conventional base station 16. Typically, there may be five to twenty base stations 15 and/or 16 serviced by a single base station controller 18.

The present invention is in the specific manner in which the base station controller 18 assign radio carrier frequencies for use by the mobile stations 19, translators 12, and home base stations 15. In the uplink direction, that is for signals transmitted from mobile station 19 towards the home base station 15-1, a signal originating at a mobile station 19 is first received at the pair omni-directional antennas 11-2-a, 11-2-b located at an exemplary translator 12-2. The translator 12-2 then converts the radio carrier frequencies of the two signals received from the mobile station 19 to different carrier frequencies. The carrier frequency conversion is within a predetermined sub-band. That is, as will be described shortly in connection with FIG. 2, the translation is wholly within a particular portion of frequency bandwidth allocated to the service provider for wireless service. The translated signals are then sent out on the directional antenna 13-2 (such as a Yagi or dish antenna) which provides a highly directional link back to the associated home base station 15-1. The translated signals are then received by the antenna 14-1 associated with the home base station 15-1 and processed in the conventional manner.

Processing in the downlink direction from the home base station 15-1 towards the mobile station 19 is analogous. In particular, the signal from the PSTN is modulated by the home base station 15-1 and then transmitted out on the antenna 14-1. The translator base station 12-2 then receives the downlink signal, via the directional antenna 13-2, which is then translated to a frequency normally assigned for the use by the mobile station 19. This translated signal is then output on one of the translator omni-directional antennas 11-2-a and then ultimately received by the mobile station 19.

Figure 2:
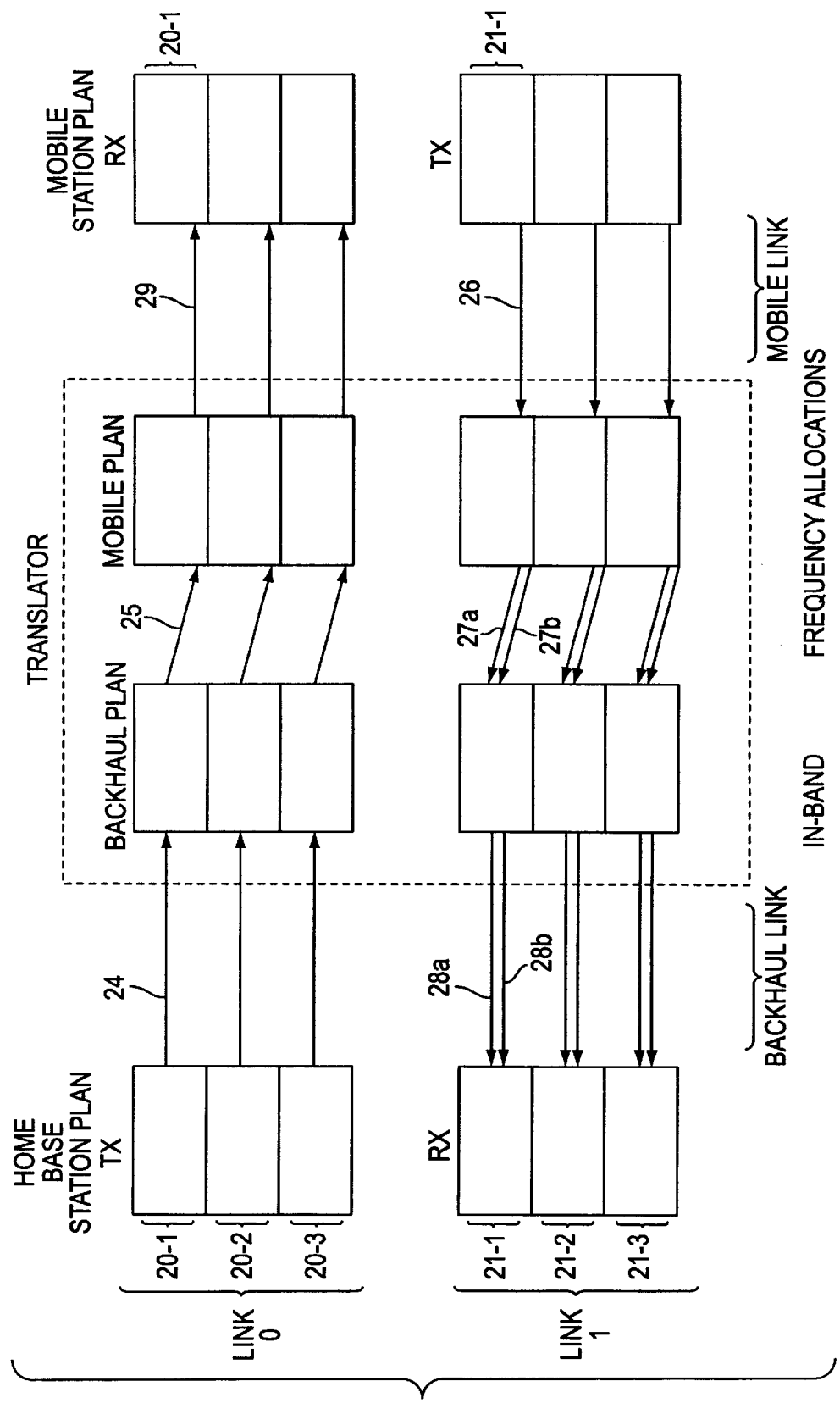
FIG. 2 is a diagram of certain system components and an overview of the frequency assignment plan which is implemented according to the invention showing the radio channels typically assigned to the home base station, translator and mobile stations.

FIG. 2 is a high level illustration of how in-band frequency assignments made to the home base station 15, the translator base station 12, and the mobile station 19 as required to practice this invention. The vertical axis in the diagram represents frequency. The four columns of boxes along the horizontal axis respectively represent frequency allocations for the home base station 15 the translators 12 and the mobile stations 19. The radio channels assigned to support communication between the home base station 15 and translator 12 are referred to herein as the backhaul link, and the radio channels used to communicate between the mobile station 19 and the translators 12 are referred to as the mobile links.

The left side of the diagram illustrates the frequency allocations typically made available to a wireless service provider, including an uplink band 21 of frequencies and a downlink band 21 of frequencies. For a PCS provider in the United States, 15 MHz of spectrum is allocated for each of the bands 20 and 21, with the lower 15 MHz band being a contiguous block of spectrum in a range from 1850 to 1910 MHz, and typically used for the uplink band 21, and the upper 15 MHz band, located 80 MHz away in the 1930 to 1990 MHz range, being typically used for the downlink band 20. A base station 12, 15, or 16 is thus assigned to transmit on the downlink band 21 and to receive on the uplink band 20.

Each of the downlink 20 and uplink 21 bands are divided into a number of sub-bands. In the illustrated embodiment for PCS there are three downlink sub-bands, 20-1, 20-2, 20-3 each representing 5 MHz. Similarly, the uplink band 21 is divided into three sub-bands 21-1, 21-2, and 21-3, each also containing 5 MHz of spectrum.

Frequency translations occur wholly within a particular subband. In particular, in the uplink direction, a mobile station 19 is assigned a particular transmit (Tx) channel within the range of a particular sub-band 21-1. The mobile station 19 then transmits this signal 26 over the mobile link to a translator 12-i serving the cell in which the mobile station 19 is located. The translator 12-i receives this signal 26 on each one of its two omni-directional antennas 11-i-a, 11-i-b, and then frequency shifts the carrier frequency of each of the two received signals to provide two different signals 27a, 27b having carrier frequencies within the same sub band 21-1. As a result, two translated signals 28a, 28b are then transmitted over the backhaul link to the home base station 15. The home base station 15 then treats these as two different receive (Rx) channels.

In the downlink direction (from the home base station 15 to the mobile station 19), a transmit (Tx) channel is first selected within one of the sub bands 20-1 for transmitting a signal 24 to the translator 12. This signal 24 is then transmitted over the backhaul link and received by the translator 12 which then shifts the carrier frequency to a signal 25 having another frequency within the same Sub band 20-1. This translated signal 29 is then transmitted over the mobile link to the mobile station 19.

As a result, the mobile stations 19 and conventional base stations 16-1 thus always continue to transmit and receive in downlink and uplink frequency bands as they would in a conventional wireless system in the sense that they transmit with a band of frequencies which is normally reserved for transmitting in a conventional base station 16-1, and receive signals in a band which is normally reserved for receiving signals.

Figure 3:
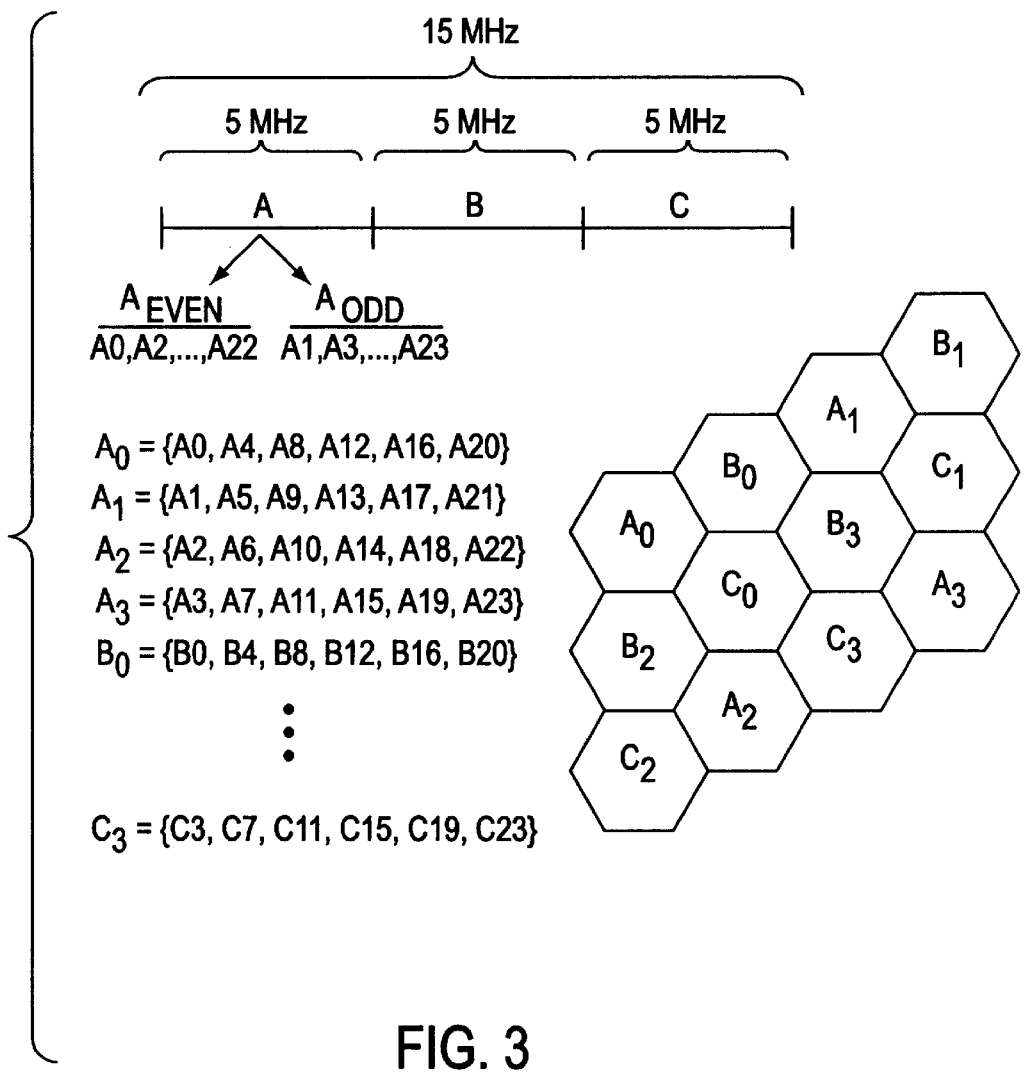
FIG. 3 is a diagram illustrating how even and odd frequency subsets are deployed in a twelve cell reuse pattern.

FIG. 3 is a more detailed diagram illustrating a preferred assignment of frequencies among the downlink sub-bands 20-1, 20-2, 20-3. (It should be understood that a similar assignment of frequencies is also made in the uplink band 21 for the sub-bands 21-1, 21-2, and 21-3.) As explained previously the available spectrum is first divided into three contiguous 5 MHz sub-bands. In the case of a PCS-1900) air interface, a given 5 MHz sub-band supports a maximum of twenty-five (25) radio frequency channels, each of which has a bandwidth of 200 Khz. Each PCS-1900 200 kHz radio channel carries up to eight (8) time multiplexed voice conversations. The channels are indexed in a fashion which allocates a letter indicating one of the three sub-bands, either A, B, C, and then a channel number, 0 through 24.

By dividing the available frequencies in this manner, it is possible to obtain four sub-sets of six channels within each of the sub-bands (although channel number 24 is not used). Each of the sub-sets is considered to comprise the channels that are spaced four channels apart within the sub-band from which it is drawn. There is thus a total of 12 sub-sets, each having six channels as follows:

$A_0$=(A0, A4, A8, A12, A16, A20)
$A_1$=(A1, A5, A9, A13, A17, A21)
$A_2$=(A2, A6, A10, A14, A18, A22)
$A_3$=(A3, A7, A11, A15, A19, A23)
$B_0$=(B0, B4, B8, B12, B16, B20)
$C_3$=(C3, C7, C11, C15, C19, C23).

Note that there are also eleven even-numbered channels A0, A2, . . . , A22 and eleven odd-numbered channels A1, A3, . . . , A23 available in any given 5 MHz bandwidth.

The allocation of these twelve sub-sets to cells in the desired eventual N=12 pattern is also shown in FIG. 3. This basic plan is not a standard twelve cell configuration but is designed so that migration of individual cells to higher reuse densities may have minimal impact on the already established frequency plan in adjacent cells. For more information on this frequency numbering scheme, please make reference to a co-pending U.S. patent application by John R. Doner entitled "Frequency Plan For Wireless Communication System That Accommodates Demand Growth To High Efficiency Reuse Factors", Ser. No. 08/749,600, filed on Sep. 13, 1996, (AirNet Communications Corp. File No. P-0090).

Figure 4:
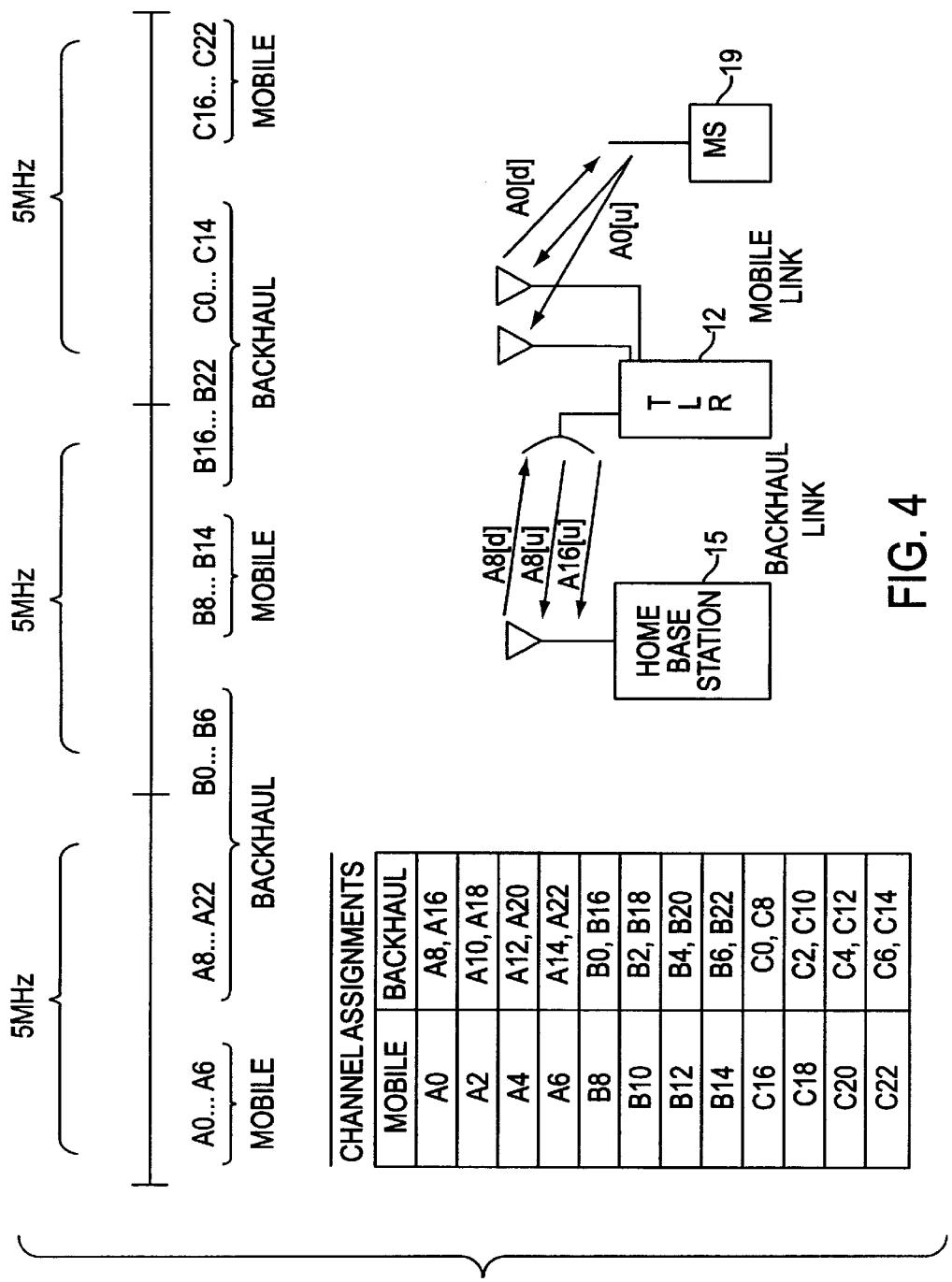
FIG. 4 is a diagram showing an allocation of an even numbered subset of frequencies according to the invention to both mobile and back haul links in a manner that supports higher density frequency reuse at later system build out stages.

Returning to the present invention, in order to satisfy the ability to eventually build out the system in the N=12 configuration illustrated in FIG. 3, channel assignments are made to the mobile links and backhaul links as shown in FIG. 4. Note that FIG. 4 contains only an illustration of the arrangement of the even-numbered channels as only every other channel typically needs to be available in any given cell, and also note that the annotation of channel letters A0, A2, . . . , C22 are actually meant to indicate a duplex pair of RF channels that are normally used to support both the uplink and a downlink to the mobile with the uplink and downlink offset by 90 MHz.

As shown in the table in the lower left-hand corner of FIG. 4 one set of mobile and backhaul frequencies is the set (A0, A8, A16), with frequency A0 assigned for use by the mobile link and the frequencies A8 and A16 assigned for use by the backhaul link. Thus the notation (A0, A8, A16) is intended to indicate, as shown in the schematic drawing in the lower right-hand side of FIG. 4 that the mobile station 19 transmits on an uplink channel A0(u). The translator 12 in turn changes the carrier frequency of the two signals received at each of its receive antennas on channels A0(u) to channels A8(u) and channel A16(u), respectively for forwarding to the broadband transceiver system at the home base station 15. In the downlink direction the home base station 15 initiates communication using channel A8(d) where it is received by the translator 12 which in turn forwards it to the mobile station 19 over a channel A0(d). The parenthesized notations (u) and (d) thus represent uplink and downlink frequencies respectively.

It is thus seen that from the table in the left hand corner of FIG. 4 there are twelve total possible sets of channel assignments that may be made so that one specific mobile frequency and two backhaul frequencies are assigned to each call, which is the same number as the eventual cell reuse factor. The particular arrangement of the channels, into groups which are spaced eight channels apart provides maximum offset to case design restrictions in the translator 12, which will be discussed in detail in FIG. 7 permits smooth upward compatibility with the twelve cell reconfiguration shown in FIG. 3

Figure 5:
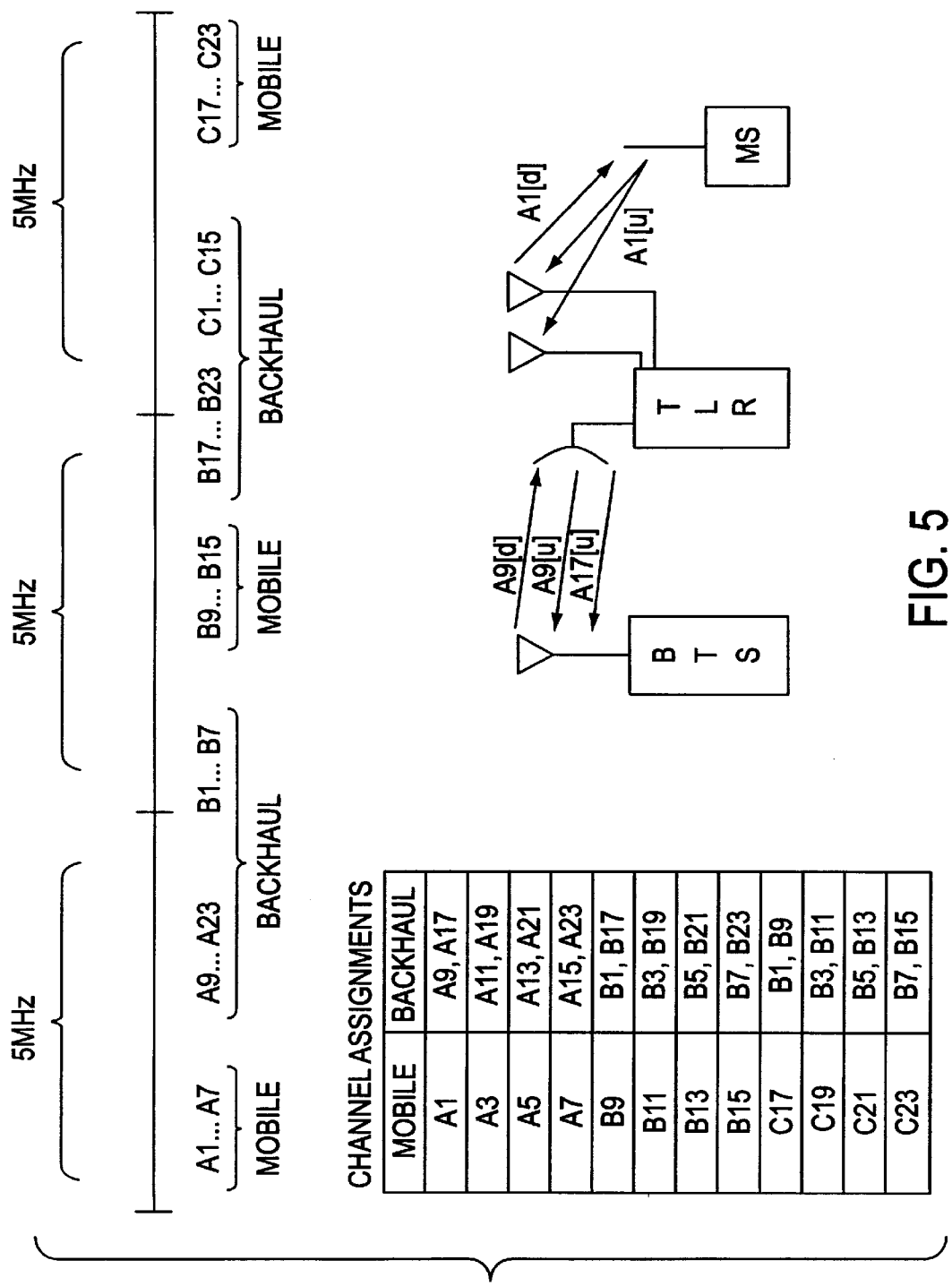
FIG. 5 is a similar diagram showing how an odd subset of frequencies is similarly assigned.

It should be understood that the illustration of FIG. 4 represents only one of two possible cases, that is, the allocation of even-indexed channels across the available 15 MHz. A similar allocation as depicted in FIG. 5 can thus be made for all odd numbered channels by increasing the indices of the channels in FIG. 4 by one.

As previously mentioned, the specific assignment of mobile and backhaul frequencies in the above fashion provides compatible frequency sets which may be re-combined in such a way as to provide assignments to a twelve cell reuse pattern or six-cell dual base station pattern, and higher reuse factors.

Figure 6B:
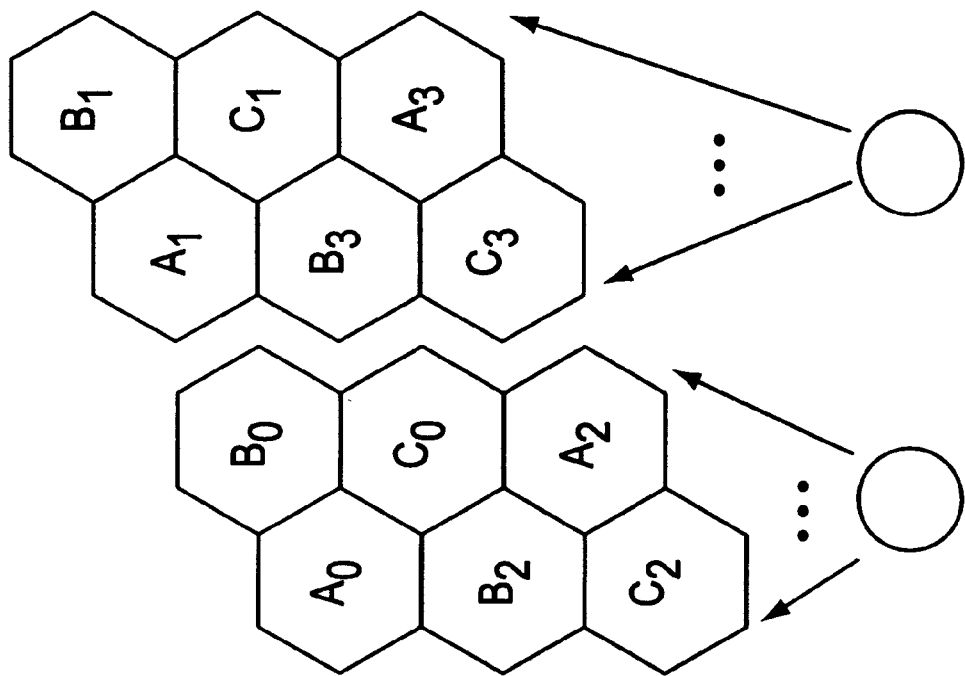
FIGS. 6A and 6B illustrate how a Broadband Transceiver System (BTS) may be deployed to serve twelve cells in either the odd or even frequency subset and in a manner such that one BTS serves six cells using the even frequencies and a second BTS serves six cells using the odd frequency set.
Figure 6A:
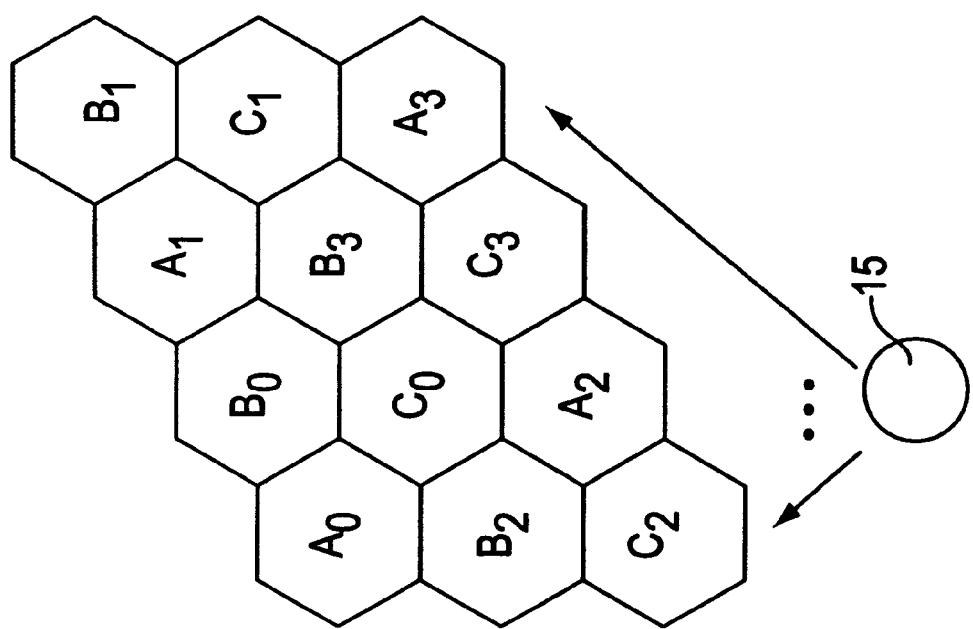

Turning attention to FIG. 6A, the initial case occurs when twelve cells are to be supported by a single broadband transceiver system and twelve translators 12 The set of RF carriers used can either be the set of all even RF carriers or the set of all odd RF carriers.

However, when some of the cells in the twelve cell pattern require an increase in some subscriber demand service such that two radio frequency carriers are required in each cell, a reconfiguration takes place. In this reconfiguration two translators 12 are deployed in each cell with the same frequency set as in use as before. At this stage, if an individual cell exceeds the level of demand satisfied by two carriers then the two translators 12 serving the cell are replaced by a Broadband Transceiver System (BTS) servicing each cell in the conventional fashion.

At the point where it becomes appropriate at which two translators per cell are deployed the cell frequency allocations are grouped in the sub-sets of six cells with all six cells in a sub-set being either the even or odd frequency sub-set as shown in FIG. 6B.

It should also be understood that a BTS can itself not only serve as a concentrator but as a cell translator and therefore the deployment of the 12 cell pattern in FIG. 6A would require typically one BTS and eleven translators with the BTS deployed in one of the center cells.

Figure 7:
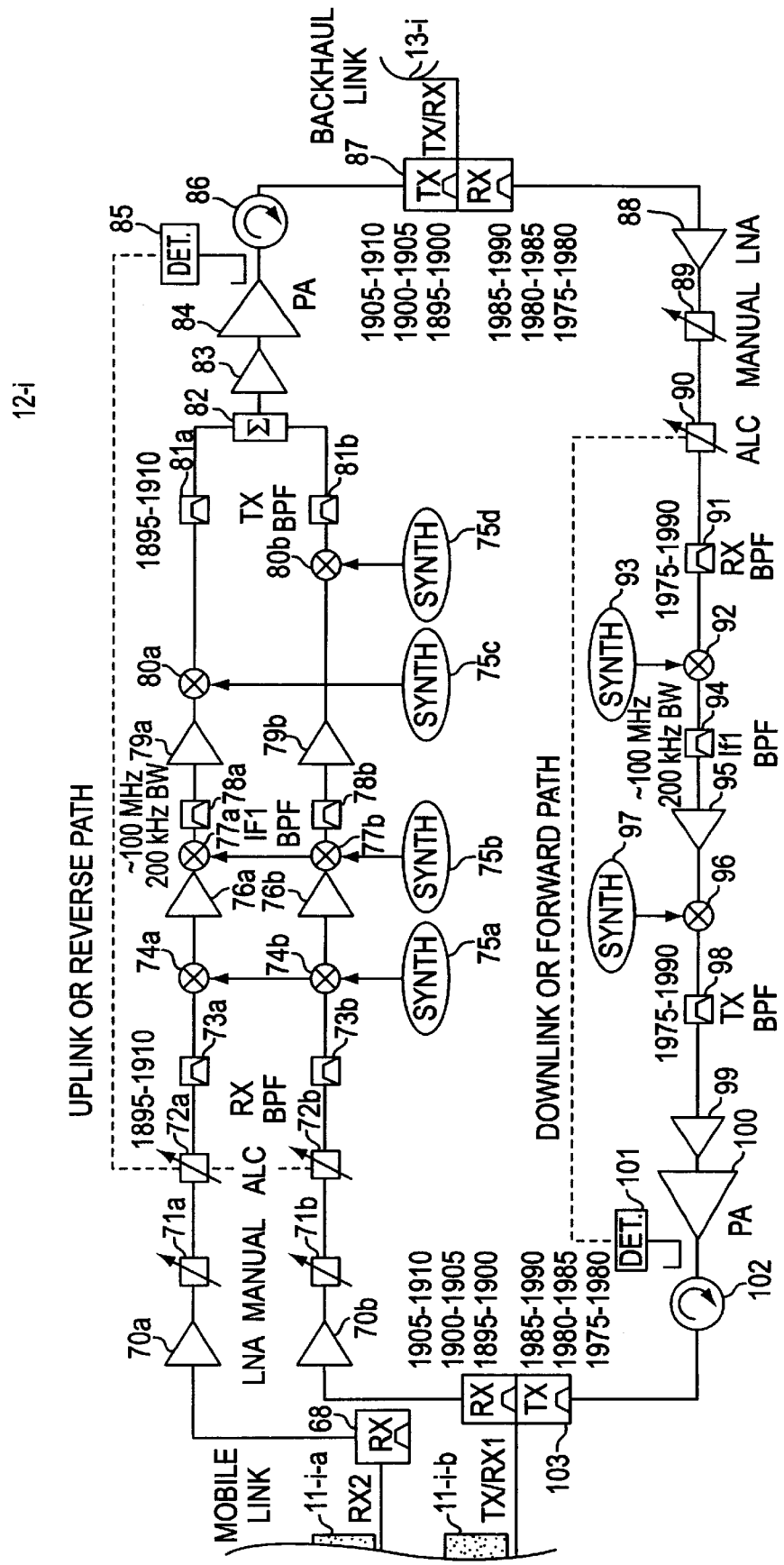
FIG. 7 is a detailed block diagram of one of the translators used in a PCS-1900 system.

FIG. 7 is a detailed block diagram of components of an exemplary translator 12. The translator 12 shifts the carrier frequency of the signals received from one link to the appropriate transmit frequency for the other link. The illustrated translator 12 also acts as a type of spatial to frequency diversity converter for the uplink direction as has already been mentioned. In particular, because in the channel assignment plan of FIGS. 4 and 5, no signal uses a radio frequency which is in use in the same cell for more than one type of link, the translator 12 may thus take advantage of spatial diversity reception on the backhaul link and use frequency diversity to maintain the information over the backhaul link. This is unlike prior art systems that use repeaters that do not preserve diversity information.

The translator 12 consists of translated signals received from the mobile link by the pair of diversity antennas 11-i-*a*, 11-i-*b*. A separate receive filter 68 and the receive portion of a duplexer 103 provide a portion of the receive signal to a pair of intermediate frequency (IF) signal processing chains consisting of a pair of low noise amplifiers (LNA) 70A, 70B, manual level adjustment amplifier 71A, 71B, automatic level control amplifier 72A, 72B, receiver band-pass filter 73A, 73B that limits the received energy to the desired 15 MHz band such as the PCS 1900 band allocated from 1895 to 1910 MHz. The mixers 74A, 74B which are driven by a first synthesizer 75A, and intermediate frequency amplifiers 76A, 76B, IF mixers 77A, 77B, and IF band pass filters 78A, 78B comprise an IF stage. The IF mixers 77A, 77B are driven by the synthesizer 75B. The IF center frequency is typically chosen to be approximately 100 MHz, with a 200 Khz channel bandwidth associated with the IF bandpass filters. The RF stage amplifier 79A and mixers 80A and 80B together with synthesizers 75C and 75D) provide up conversion of the frequency output in the desired transmit band of 1895–1910 MHz. Transmit bandpass filters 81A and 81B limit transmitted energy to the desired range and summation circuit 82 preamplifier 83 and power amplifier 84 provide the output signal.

A detector 85 provides a portion of the radio frequency energy and a signal provided by the power amplifier which is in turn fed back to the ALC amplifiers 72A and 72B. Directional coupler 86 provides radio frequency energy to the output duplexer 87.

So, in the case where the first even frequency sub-set is assigned to translator 12-i, namely the frequency sub-set (A0, A8, A16), where the backhaul link in the up link direction is to use frequencies A8, A16, the synthesizers 75 are tuned to the appropriate frequencies to provide the first and second signal paths respectively at the desired carrier frequencies of A8 and A16.

In the backhaul to mobile direction, the signal is first received on the omni-directional antenna 13-1 from the home base station and forwarded to the duplexer 87. In this direction area only a single signal chain is needed. The RF signal output provided by the duplexer 87 is passed to a first low noise amplifier 88, manual adjustment amplifier 89 and to an automatic level control circuit 90. The output of the automatic level control 90 is in turn forwarded to a receiver bandpass filter 91 and IF stage consisting of a synthesizer 93, mixer 92, and IF bandpass filter 94, chosen to provide an IF signal having a center frequency in the range of approximately 100 MHz at 200 Khz bandwidth. A final IF stage amplifier 95 in turn feeds a RF mixer 96 and synthesizer 97 which in turn up-converts the signal back to the transmit band, in this case, being 1975–1990 MHz. The output of the transmit bandpass filter 98 is in turn fed to the preamplifier 99 and power amplifier 100 prior to being fed to the directional coupler 102 and transmit portion of the duplexer 103, ultimately out to the antenna 11-1-B. A detector 101 provides the back of the energy output for the power amplifier back to the automatic level control circuit 90.

Typically, class A linear amplifiers are used throughout the translator 12 in both the forward and reverse paths and the translator 12 is typically implemented with switch programmable synthesizers so that the channel settings deployed may be easily selected in installation or when the system needs to be reconfigured.

The translator 12 is capable of receiving signals at relatively low levels and then retransmitting them at relatively high power levels over the mobile link with the automatic level control circuit typically designed to control the transmitted forward path signal at a maximum of 10 watts.

In the reverse path, that is from the mobile to the backhaul link, the translator 12 is designed to receive a signal from its omni-directional antennas 11-i-*a*, 11-i-*b* and to retransmit to the base transceiver system 15 with up to approximately 125 dB of signal gain with power of as high as 1 watt over the directional antenna 13-1.

As a result, two reverse mobile transmit diversity channels are continuously transmitted back to the base transceiver system on different frequencies. This allows for coherent diversity summation to take place, after digital demodulation within the home base station. This is much more effective and accurate than simple RF switching or detection at the site of the translators. The net effect is that even with a deployment of these "range extending" translators 12, the received signal performance expected is as effective as deploying a standard base transceiver system in each of the home base station sites against multi-path fading and noise.

It is now understood how a wireless communication system may be configured to permit deploying high efficiency broadband transceiver system equipment by using in-band translators laid out in a conventional system footprint. The advantages of the invention may be used to provide to an effective system coverage area without the need for building out more high capacity broadband base transceiver systems than is absolutely necessary. Furthermore, there is no difficulty with implementing directional or diversity antennas so that multi path distortion effects and other problems may be adequately addressed. Backhaul costs also are minimized by taking advantage of the frequency allocations already made to the service provider.

What is claimed is:

1. A method for assigning in-band radio frequency channels to a plurality of translating repeaters, home base stations and mobile stations in a cluster of cells forming a wireless cellular communication system, comprising the steps of:

selecting three uplink sub-bands within an uplink band of frequencies for communications originating from said mobile stations;

selecting twenty-four alternately odd and even uplink channels for said translating repeaters within each said subband; and selecting a set of mobile uplink channels for a set of mobile communication links between said mobile stations and said translating repeaters to include four of said uplink channels from each said subband.

2. The method according to claim 1 further comprising the step of selecting all four of said mobile uplink channels to be even.

3. The method according to claim 2 further comprising the step of selecting said mobile uplink channels to be a lowest frequency set of four even uplink channels in a lowest frequency one of said subbands, the second from lowest frequency set of four even uplink channels in a next higher frequency one of said subbands, and the third from lowest frequency set of four even uplink channels in a highest frequency one of said subbands.

4. The method according to claim 3 further comprising the step of selecting a set of backhaul uplink channels for a set of backhaul communication links between said translating repeaters and said home base stations to be each respectively spaced eight uplink channels from a corresponding mobile channel.

5. The method according to claim 4 further comprising the step of selecting a second set of backhaul uplink channels for a second set of backhaul communication links between said translating repeaters and said home base stations to be each respectively spaced sixteen uplink channels from a corresponding mobile channel.

6. The method according to claim 1 further comprising the step of selecting all four of said mobile uplink channels to be odd.

7. The method according to claim 6 further comprising the step of selecting said mobile uplink channels to be a lowest frequency set of four odd uplink channels in a lowest frequency one of said subbands, the second from lowest frequency set of four odd uplink channels in a next higher frequency one of said subbands, and the third from lowest frequency set of four odd uplink channels in a highest frequency one of said subbands.

8. The method according to claim 7 further comprising the step of selecting a set of backhaul uplink channels for a set of backhaul communication links between said translating repeaters and said home base stations to be each respectively spaced eight uplink channels from a corresponding mobile channel.

9. The method according to claim 8 further comprising the step of selecting a second set of backhaul uplink channels for a second set of backhaul communication links between said translating repeaters and said home base stations to be each respectively spaced sixteen uplink channels from a corresponding mobile channel.

10. The method according to claim 8 further comprising the steps of:
defining four subsets of said uplink channels within each said subband, and assigning each said subset six uplink channels that are spaced four uplink channels apart within said sub-band; and
replacing at least one of said translating repeaters with a base station, and assigning to said base station one of said subsets of said uplink channels, said subset of channels including said mobile and backhaul uplink channels which had been assigned to said translating repeater being replaced.

11. The method according to claim 1 wherein each of said uplink channels has a corresponding downlink channel having a predetermined frequency offset from said uplink channel.

12. A wireless cellular communication system utilizing a plurality of channels, comprising:
a translating repeater for receiving and transmitting on three uplink sub-bands within an uplink band of frequencies assigned for communications originating from a plurality of mobile stations, said translating repeater configurable for operating on twenty-four alternately odd and even uplink channels within said subband; and
a mobile uplink channel assigned to said translating repeater for providing a communication link between a mobile station and said translating repeater selected from the group consisting of a lowest frequency set of four even uplink channels in a lowest frequency one of said subbands, the second from lowest frequency set of four even uplink channels in a next higher frequency one of said subbands, and the third from lowest frequency set of four even uplink channels in a highest frequency one of said subbands.

13. The system according to claim 12 further comprising a backhaul uplink channel assigned to said translating repeater for a backhaul communication link between said translating repeater and said home base station, said backhaul repeater spaced eight uplink channels from the mobile uplink channel assigned to said translating repeater.

14. The system according to claim 13 wherein said translating repeater is assigned a second backhaul uplink channel for a second backhaul communication link between said translating repeater and said home base station, said second backhaul channel spaced sixteen uplink channels from said mobile channel assigned to said translating repeater.

15. The system according to claim 12 wherein said mobile uplink channel for said mobile communication link between said mobile stations and said translating repeaters is selected instead from the group consisting of a lowest frequency set of four odd uplink channels in a lowest frequency one of said subbands, the second from lowest frequency set of four odd uplink channels in a next higher frequency one of said subbands, and the third from lowest frequency set of four odd uplink channels in a highest frequency one of said subbands.

16. The system according to claim 15 further comprising a backhaul uplink channel assigned to said translating repeater for a backhaul communication link between said translating repeater and said home base station, said backhaul repeater spaced eight uplink channels from the mobile uplink channel assigned to said translating repeater.

17. The system according to claim 16 wherein said translating repeater is assigned a second backhaul uplink channel for a second backhaul communication link between said translating repeater and said home base station, said second backhaul channel spaced sixteen uplink channels from said mobile channel assigned to said translating repeater.

18. The system according to claim 12 wherein said uplink channels in each subband are each divided into four subsets comprised of six uplink channels spaced four uplink channels apart within said sub-band and said mobile and backhaul channels assigned to said translating repeater are all within a single subset;
whereby a base station for replacing said translating repeater can be assigned said subset of channels including said mobile and backhaul uplink channels which had been assigned to said translating repeater without modifying frequency channels assigned to any other of said translating repeaters.

19. The system according to claim 12 wherein each of said uplink channels has a corresponding downlink channel having a predetermined frequency offset from said uplink channel.

20. A wireless cellular communication system utilizing a plurality of channels, comprising:

a translating repeater for receiving and transmitting on a plurality of uplink sub-bands within an uplink band of frequencies assigned for communications originating from a plurality of mobile stations, said translating repeater configurable for operating on a defined set of alternately odd and even uplink channels within said subband; and a mobile uplink channel assigned to said translating repeater for providing a communication link between a mobile station and said translating repeater selected from the group consisting of a lowest frequency set of even uplink channels in a lowest frequency one of said subbands, the second from lowest frequency set of even uplink channels in a next higher frequency one of said subbands, and the third from lowest frequency set of even uplink channels in a highest frequency one of said subbands.

21. A method for assigning in-band radio frequency channels to a plurality of translating repeaters, home base stations and mobile stations in a cluster of cells forming a wireless cellular communication system, comprising the steps of:

selecting a plurality of uplink sub-bands within an uplink band of frequencies for communications originating from said mobile stations;

selecting a set of uplink channels for said translating repeaters within each said subband;

selecting a set of mobile uplink channels for a set of mobile communication links between said mobile stations and said translating repeaters to include a plurality of said uplink channels from each said subband;

selecting a set of backhaul uplink channels for a set of backhaul communication links between said translating repeaters and said home base stations to be each respectively spaced a pre-defined integer number of uplink channels from a corresponding mobile channel;

defining a plurality of subsets of said uplink channels within each said subband, and assigning each said subset a predetermined integer number of uplink channels that are spaced a pre-defined integer number of uplink channels apart within said up-link sub-band; and wherein said up-link sub-bands, said plurality of subsets of said uplink channels, and said uplink and backhaul channels are all selected such that upon replacing one of said translating repeaters with a base station, said subset of uplink channels comprising said backhaul and mobile channels which had been assigned to said translating repeater can be assigned to said base station as uplink channels without causing interference with adjacent cells.

* * * * *